United States Patent
Yevick

[11] 4,057,338
[45] Nov. 8, 1977

[54] FIBER OPTIC SYSTEM

[75] Inventor: George J. Yevick, Leonia, N.J.

[73] Assignee: Izon Corporation, Stamford, Conn.

[21] Appl. No.: 643,831

[22] Filed: Dec. 23, 1975

Related U.S. Application Data

[60] Division of Ser. No. 427,355, Dec. 21, 1973, and a continuation-in-part of Ser. No. 223,612, Feb. 4, 1972, abandoned.

[51] Int. Cl.² .......................... G03B 27/00; G02B 5/14
[52] U.S. Cl. ...................................... 355/1; 350/96 R; 355/32; 355/54
[58] Field of Search .................. 355/1, 22, 32, 46, 50, 355/54; 354/125, 115; 350/96 R

[56] References Cited

U.S. PATENT DOCUMENTS

| | | | |
|---|---|---|---|
| 3,473,872 | 10/1969 | Okamura | 355/1 |
| 3,825,336 | 7/1974 | Reynolds | 355/1 |

FOREIGN PATENT DOCUMENTS

| | | | |
|---|---|---|---|
| 2,239,225 | 2/1973 | Germany | 355/1 |

Primary Examiner—Richard A. Wintercorn
Attorney, Agent, or Firm—Thomas J. Greer, Jr.

[57] ABSTRACT

An optical magnifying device employing fiber optics. When functioning as a microscope, the object plane is defined by and divided into sub-areas by the input termini of many coherent fiber bundles. Each output terminal of each bundle is provided with an objective lens which projects onto an image plane. When used as a microfiche reader, a first magnifying stage is provided, and this (first) image is in turn further magnified in the same manner. Microfiche characters of 2 micron size may be resolved by the entire system.

2 Claims, 17 Drawing Figures

FIBER OPTIC SYSTEM

This is a division of application Ser. No. 427,355, filed Dec. 21, 1973, and a continuation-in-part of application Ser. No. 223,612 filed Feb. 4, 1972, now abandoned.

This invention relates to a magnifying device and more particularly to a large area projection microscope. There exists a real need for a microscope which can present in one moment of time a very large area which is under study or observation. An example of such a requirement is presented in the biological sciences wherein it is desired to study the aggregation of cells into colonies. For such sturies real time, in vivo observation of tumors is desired. Further, in the electronics industry, there exists a need for observing large areas of integrated chips for solid-state devices. Still other examples may be found in metallurgy where it is desired to observe large areas on the surface of metals.

The invention further exhibits utility as a microfiche reader. For this use, a first stage magnification is provided. The first stage image then defines the object for the fiber optic magnifying system.

The following is presented as background to the microfiche reader application of the invention, although it is not essential for a complete understanding.

The basic question of maximum optical storage and transmission of intelligence has two aspects. The first is the actual storage of intelligence. Here, the cost of the medium, such as AgBr emulsion, photopolymers, metallic film, vesicular recording, etc., is proportional to the area. The area utilized depends on the inverse square of the magnification of the overall system, i.e., if M is the magnification $$\text{Area} = 1/M^2$$

Other considerations being equal, if one system magnifies ten times more than another, its cost is 100 times less. Hence, there is a need for high magnification.

Besides the cost of material, the expense of storing must be considered. Here again each separate storage process has its own economics. This includes the optics required to store and the cost of image developing.

The second aspect is convenience and low cost of read out or retrieval. If the optical system for read out is elaborate and very costly, the micro-reader or viewer is confined to only a limited number of users.

An example of commercially available intelligence is a small Bible. There, 1,245 pages are reduced on a 1-5/16 inch by 1-5/16 inch area or 1.72 inches$^2$, and 0.015 inches thick. This Bible has an area reduction of 48,400 to 1, or a magnification factor of 220, i.e., $220^2 =$ 48,400. If one were to use a 8 1/2 × 11 inch film and employ the same printing process, the result would be 68,000 pages or the equilavent of 54.5 Bibles or 227 books, each having 300 pages. At the present time, there is no optical system other than a microscope for handling this Bible. Hence, M=220 is not practical with existing systems.

A practical system in the sense that intelligence as well as micro reader or viewer are commercially available and economically viable, is National Cash Register Corporation's PCMI system (hereafter referred to as NCR system).

The NCR system utilizes a 4 × 6 inch microfiche possessing a magnification M=150. On each fiche is located around 6,000 pages of intelligence. In principle, if all the area were devoted to microintelligence a total of 13,500 pages of 5 × 3 inch initial copy could be located on a 4 × 6 inch fiche for an M=150. Hence, the problem of physical storage of a vast amount of intelligence has been solved to a certain extent. However, the reading machine for this system is rather bulky and expensive because of its complicated optics, and inconvenient in contrast to a book or a magazine.

In contrast, the subject reading device which can easily handle M=150, is compact, inexpensive, and very convenient vis-a-vis a book, magaine, or existing movie projector.

The ultimate storage capability of light is given by the famous resolution criteria due to Lord Rayleigh:

$$\Delta_X = 0.61 \, \lambda/n \sin \alpha = 0.61 \, \lambda/\text{N.A.}$$

Where $\lambda$ is the wavelength of light used, and $n \sin \alpha = \lambda$ N.A. is the numerical aperture of the optical system. In the subject optical system, the N.A. is around 1. Therefore, $$\Delta_X \approx 0.6 \, \lambda$$

$\Delta_X$ is, in essence the size of a diffraction spot formed by the optical system of a point source due to the wave nature of light. In brief, one cannot see any detail inside this spot radius. Hence, in essence, one can store (area wise) one bit (e.g. dark or not dark in a AgBr emulsion) on an area $$(\Delta_X)^2 = (0.6)^2 \lambda^2$$

This is the limit of intelligence storage using light as the recording medium.

On page 542 of Mees-James classic book, "The Theory of the Photographic Process", 3rd Edition, published by MacMillan, is a photomicrograph of a photographic made on Kodak Spectroscopic Film, Type 649, showing very legible characters originally 2 microns in height and magnified at least 750 times (M=750). A character (letter of the alphabet) has about 50 bits associated with it. Hence, the example quoted above falls just within the diffraction criteria. In the Mees-James reference, the characters are 2 microns in height. This is the diffraction limited range. Let an area of 6 microns$^2$ be ascribed to each character. This is reasonable for a character located in an area 2 microns by 3 microns.

The following table illustrates the theoretical capability of (diffraction limited) information storage.

| Area | Number of Characters and Spaces | Number of Pages | Number of Novels | Number of 30 Minute Movies |
|---|---|---|---|---|
| 1 sq. inch | $1.075 \times 10^8$ | 49,000 | 163 | $1.5 \times 10^{-3}$ |
| 3" × 5" fiche | $1.61 \times 10^9$ | 731,000 | 2,440 | $2.2 \times 10^{-2}$ |
| 4" × 6" fiche | $2.58 \times 10^9$ | 1,172,000 | 3,910 | $3.6 \times 10^{-2}$ |
| 8½" × 11" fiche | $1.00 \times 10^{10}$ | 4,550,000 | 15,200 | $1.4 \times 10^{-1}$ |
| Philips cassette (area = 965 in$^2$) | $1.04 \times 10^{11}$ | 47,300,000 | 157,500 | 1.5 |

(Philips cassette is standarized to 1/7 inch width and plays 60 minutes at 1⅞ inches per second). A typical page in a novel contains approximately 2,200 characters and dead spaces and a typical novel has 300 pages. If the U.S. Library of Congress is estimated at having 9,000,000 volumes of 300 pages each, then 58 (Philips) cassettes would store the entire library. This shows the immense power in storing intelligence at the diffraction limit of light.

In the application of the invention as a microfiche reader, a first stage magnification is provided, The resultant magnification is then the product $M_1M_2$ of the first (conventional) stage $M_1$ and the second (fiber optic) stage $M_2$. The second stage may be characterized as including a large screen viewer and coherent light fiber bundles leading to a multiple matrix of micro-optic systems or cells. Such a stage is termed COMO, an acronym for coherent optical matrix organizer. The COMO stage takes the image of the first stage, as a real image, and enlarges it $M_2$ more times for final viewing projection. The COMO stage alone may be employed as a microfiche reader as well as a microscope if desired.

When both stages are used the objective of the first stage takes the microfiche (henceforth referred to as object) and magnifies it. The optimum (sharpest) image formed by the objective forms a surface. If the objective system is free of spherical aberration, coma, and astigmatism, the sharpest image is formed on a spherical surface as given by Petzval's theorem. However the optimum image surface is not necessarily spherical, due to optical aberrations, and this plays an important role in the invention. COMO now utilizes the real image formed by the objective as an object to form a new and final real image on a screen. At the Petzval surface of least aberration, no matter what its exact shape, is located a regular array of closely packed optical fibers. The input terminal size of this array must be the same size as the image formed by the objective.

It is well known that each individual optical fiber transmits the intensity of the light incident on one end anywhere, with small loss, within a distance less than its length at the other end. At the other end, this light now comes out as a cone of light. However, the phases prevailing at each fiber entrance are no longer maintained. In short, the image at one end is the same as the image at the other end only if the fiber entrance faces lie at or near the Petzval surface. If the entrance fiber faces are placed at random anywhere else, up or down the optic axis of the objective, only noise will result at the viewing or image end of COMO.

The bundle at the Petzval surface is divided into N discrete bundles. Each sub-bundle carries with it a portion of the image located at the Petzval surface. Each micro-portion of the image now serves as a micro-object for a micro-optic cell of which there are N cells, one sub-bundle per micro-optic cell. These micro-cells are arranged in a regular array such that the different final micro images produced by the micro optics are joined together in registry to form a faithful image of the initial object located in front of the objective. Each micro-optical cell must be electromagnetically decoupled by suitable masking from all other micro-optical cells. Failure to do so leads to crosstalk or introduction of noise from one cell to another. By utilizing very short focal length $f_2$ optics in the micro-optic cells, the throwing distance required for large magnification $M_2$ is small (approximately $M_2f_2$), hence the dimensions of the mi-cro-viewer are very small. The throwing distance is the principal stumbling block in any compact microreader.

For the complete system, let:

$A_f$ = Area of final image on screen
$A_o$ = Area of ultrafiche object
$A_1$ = Area of image produced by objective
$N$ = Number of micro-optical cells
$M$ = Overall magnification of system
$M_1$ = Magnification produced by objective
$M_2$ = Magnification produced by a single micro-optical cell Then the following relations now obtain between the above quantities. The objective produces a magnification $M_1$ or $$M_1^2 = A_1/A_o$$

COMO now takes the image of size $A_1$ and breaks it up or dissects or tears apart image of size $A_1$ into N distinct objects, each of area $$A_1/N = M_1^2 A_o/N$$

distributes these N micro-objects at predetermined locations, the totality of areas of the micro-object being, of course, $N(A_1/N) = A_1$. However, these tiny micro-objects are distributed over an area $A_f$.

Each micro-object is now magnified $M_2$ times by the micro-optics of the micro-optical cells of COMO. Hence, the area of the final image generated by the micro-optical cell is $$M_2^2 A_1/N = M_2^2 M_1^2 A_o/N$$

Since there are N micro-optical cells, the total area is $$A_f = N(M_2^2 A_1/N) = M_2^2 M_1^2 A_o$$

But
$M = M_1 M_2$
$A_f = M^2 A_o$
or $A_o = (1/M^2) A_f$

The optical performance of COMO is integrated with the optics of the objective, the two forming an integral unity. Aberrations generated by the objective can deliberately be corrected by COMO. In principle, there is no practical limit to the magnification or overall area of the final image. There is, however, a well defined limit on the degree of resolution attainable.

An individual fiber picks up intensity of light and not phase, and inasmuch as the N.A. of the fiber given by:

$$N.A. = n \sin \theta = (n_o^2 - n'^2)^{\frac{1}{2}}$$

it is for all practical purposes N.A.=1. The minimum size of detail in an object that can be detected is around twice the diameter of an individual fiber.

The following table presents data for an initial letter size $2\mu \times 2\mu$, the smallest character that can be stored optically and recalled optically. For purposes of illustration a magnification M of around 1,250 is analyzed. If $M_1$ is 40 then the letter size is $80\mu \times 80\mu$ and now a $d = 10$ micron fiber would produce an extremely excellent representation in the final image $2,500\mu \times 2,500\mu$. Such very high resolution fibers are commercially available.

| | M = 1250 Initial Letter Size 2μ × 2μ | | | | |
|---|---|---|---|---|---|
| $M_1$ | Letter Size | $M_2$ | $\Delta/M_2$ | Final Letter Size | Max. Fiber Diameter |
| 40 | 80μ × 80μ | 30 | 5μ | 2500μ × 2500μ | 12μ |
| 60 | 120μ × 120μ | 20 | 7.5μ | " | 17μ |
| 90 | 180μ × 180μ | 15 | 10μ | - | 25μ |

An estimate of maximum fiber diameter can be made if the individual fibers within a single coherent fiber bundle are not to be resolved by the eye. Assume that the eye can resolve 2 minutes of arc. Then at 10 inches away, resolution between two points spaced $\Delta$ is possible $$\Delta = 100 = 5.9 \text{ mils} = 148 \text{ microns}$$

Hence, in order not to detect individual fibers, a desirable feature in COMO, the diameter of the fibers must be around 5 to 10 microns.

By way of further background, now directed to microscopy, it has been necessary to mechanically displace the object with respect to the optical system whenever it was desired to observe large areas of the object or objects under study. That is to say, the object would be moved so as to present different attitudes to the input to the optical system. This was due to the fact that the field of view of microscope optical systems has been relatively small. This in turn has been due to the short focal length of the objective lens required in order to effect large magnification. With the invention very large areas such as 1 × 1 inch can be magnified by a single stage of COMO to a compact viewer 90 × 90 inch and less than two inches thick.

According to the practice of the present invention, the object plane is divided into a plurality of sub-areas or micro-areas. Each of these sub-areas may be considered the optical input to one end of a fiber optic bundle. Such bundles are well known in the optic arts and are formed of a large number of glass filaments. The individual filaments are coated with a cladding material, so that each fiber is totally interally reflecting. A ray of light entering one end of such a fiber, substantially normal to the face thereof, will exit in a similar manner from the other fiber end, even though the fiber is curved or bent between its ends. If the bundle is assembled from individual fibers in such a manner that the fiber ends at both ends of the bundle occupy homologous positions, then the bundle is said to be coherent. With coherent bundles of fibers, an image at the output end will be formed of an object at the input end. A single fiber optic filament will, in general, not have this property. However, in the case of a single fiber, an image may be formed if the internal refractive index varies from the center of the fiber to its periphery as $\sqrt{1-r^2/a^2}$, where $r$ is the radial distance and $a$ is the maximum radius. Such fibers are marketed under the trade name Selfoc and are available from Nissho-Iwai American Co., 110 Wall St., New York, N.Y. 10005 and are manufactured by Nippon Sheet Glass Co., Selfoc Div., 1 Kaidoshita, Konoike, Itami, Hyogo Pref., Japan. In the subsequent discussion, the phrase coherent light guide (CLG) is intended to embrace a single fiber having the property of Selfoc, as well as coherent fiber bundles. The other each of each CLG is in association with an objective for projection onto a viewing screen.

Figures 1, 2:
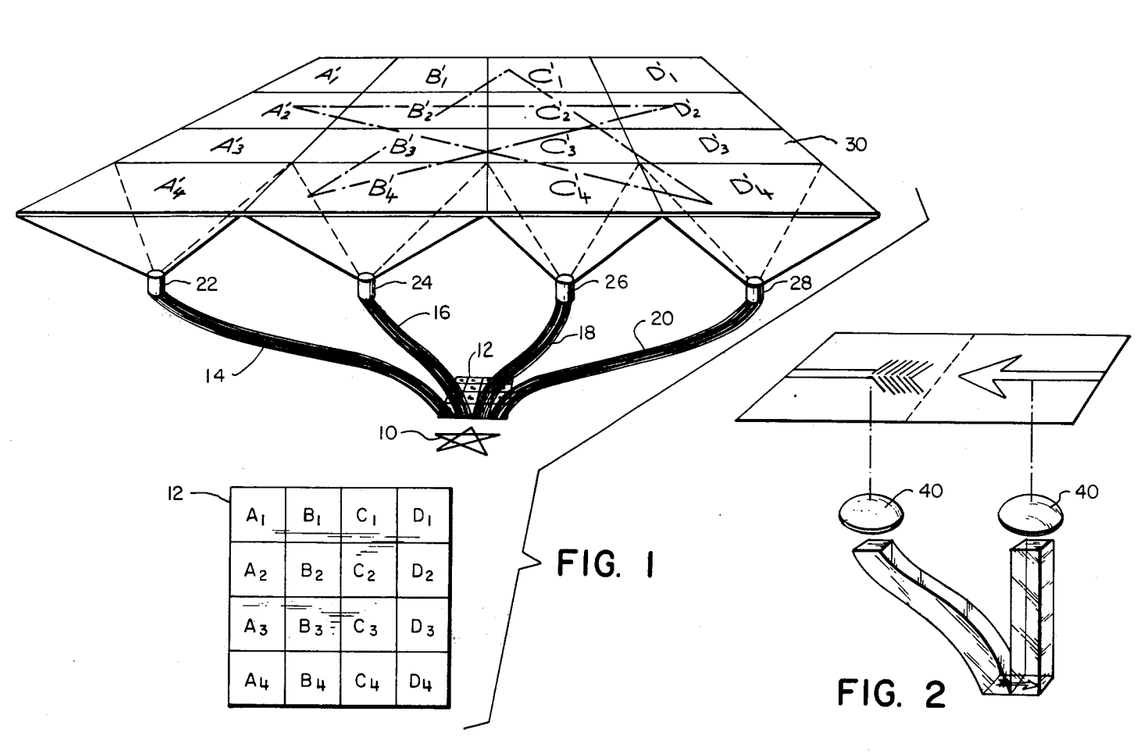
FIG. 1 is a schematic view of a microscope constructed in accordance with the practice of this invention.
FIGS. 2 and 3 illustrate how adjacent coherent fiber bundles are twisted to compensate for image inversion.

Referring now to FIG. 1 of the drawings, an object 10 as for example one cm. square in area is illustrated as magnified 100 fold into an area 1 square meter by a COMO system. For purposes of illustration, 16 unit cells are illustrated, although in practice the required number will depend upon the magnification, resolution, size of object desired, and the like. The small square 12 in the lower left-hand portion of FIG. 1 illustrates an arbitrary division of the object plane into 16 unit cells, the individual cells designated as indicated. The numerals 14, 16, 18, and 20 denote four coherent light guides (CLG) whose lower termini define their respective portions of the object plane. It will be understood that the remaining twelve coherent light guides have their lower or input termini positioned on and defining the remaining portions of the object plane 12. The coherent light guides diverge upwardly and outwardly from the object plane and their upper or output termini are fixed with respect to each other, supported by a grid or other suitable support. A projection lens system is associated with each upper or output end of the coherent light guides. Thus, the numerals 22, 24, 26, and 28 designate, respectively, projection lens systems.

Considering the lower rightmost sub-area $D_4$ of object plane 12, lens system 28 projects the output from coherent light guide 20 onto area $D'_4$ of the image plane. The image plane is illustrated in FIG. 1 as coincident with a large viewing screen. It will be understood that the system 28 enlarges the area of the corresponding object sub-area by an amount proportional to both its focal length and distance from the image plane. The projection systems 22, 24, etc. occupy the same positions relative to the viewing screen 30 as the input termini of CLG members 14, 16 etc. occupy with respect to the object plane 12.

The reader will readily visualize that each of the illustrated sixteen areas in the image plane 30 receives light from its corresponding coherent light guide and that a final and complete image is formed. In general, the mode of operation is as follows. Light from the object is piped or transmitted by the coherent liquid guide to the projection lens systems. In general, these lens systems are of very short focal length. Accordingly, if each optical cell employs paraxial or small angle rays with respect to the micro-optical cell axis very little aberration is present. This is in distinction to more common microscope arrangements wherein as large an object size as possible is spanned without optically breaking up the object into sub-areas. Further, because short focal length lenses are employed, corresponding short projecting distances are required. Accordingly, a compact optical system is realized.

Figures 3, 4:
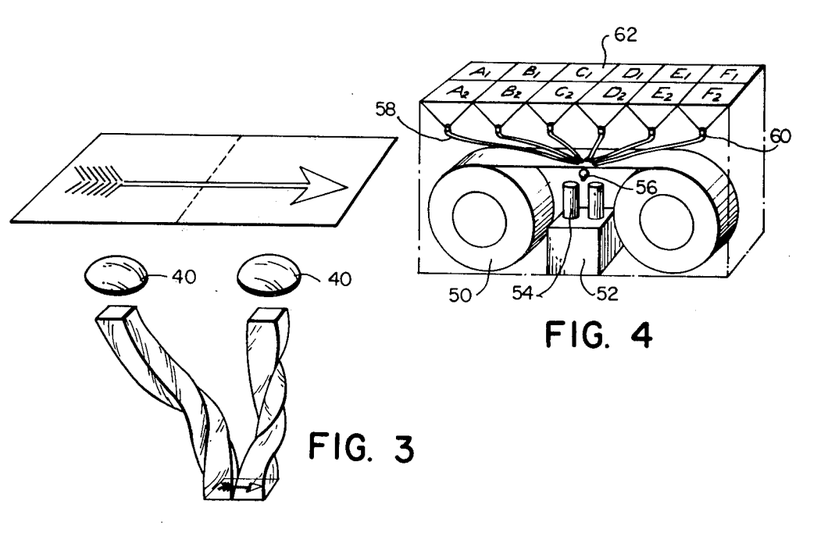
FIG. 4 is a sectional perspective illustrating the system of FIG. 1 as applied to a cassette type reader.

In general, the projecting lens systems are simple, requiring one or at most two lenses. For very elaborate and precise work, other lens systems may be required as will be later discussed. In the event that a single projection lens 40 is employed the image will be inverted as illustrated at FIG. 2. This would result in an incoherent image on the screen. To correct this, it is necessary to twist by 180° adjacent CLG elements as seen at FIG. 3. If a second lens is used, this can reinvert the image and the twisting will be unnecessary.

The resolution of a microscope constructed according to the above description is comparable to the diameter of a single optic fiber element. Fibers are at present commercially available with diameters approaching several microns and accordingly resolutions approaching the wavelength of visible light will soon be possible. By oscillating an individual coherent fiber bundle randomly at a frequency of a few hundred cycles per minute over a distance roughly four or five times the diameter of a single fiber, the resolution may be improved by a factor of three or four. Thus, a ten micron fiber bundle may produce a resolution of 2.5 microns.

In FIG. 4 of the drawings, a cassette viewer which embodies the optical system shown at FIG. 1. A cassette real 50 is conventionally mounted and advanced. A drive mechanism 52 is shown and cells 54 provide power for lamp 56. Coherent light guides 58 with associated projection optics 60 at their upper termini throw the information of screen 62. The lower termini of the CLG elements 56 are placed contiguous and normal to the transparent cassette tape.

Figure 5:
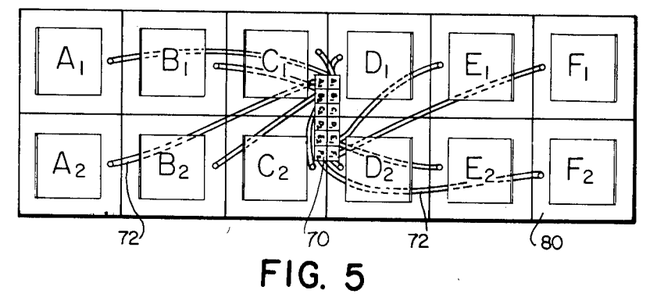
FIGS. 5 and 6 illustrate the use of mirrors as an embodiment of the system of FIG. 4.
Figure 6:
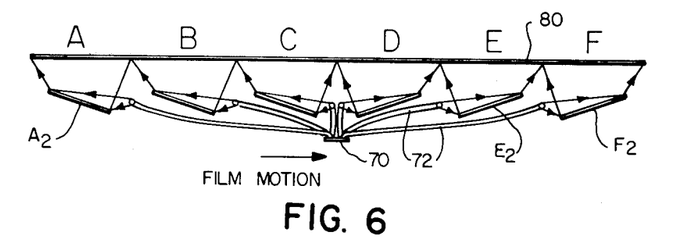

In FIGS. 5 and 6 of the drawings, a variant optical system for a cassette viewer is shown. A portion 70 of a film, such as from cassette 50, is illuminated in the same manner as that shown at FIG. 4. The lower termini of coherent light guides 72 are placed adjacent and normal to the surface of film segment 70, their other termini provided with projection optics (not illustrated) such as 22, 24, etc. of FIG. 1 which throw onto $A_1$, $A_2$–$F_1$, $F_2$. The arrangement is such that areas A, B,–F, widthwise, appear on viewing screen 80.

Figures 7, 8:
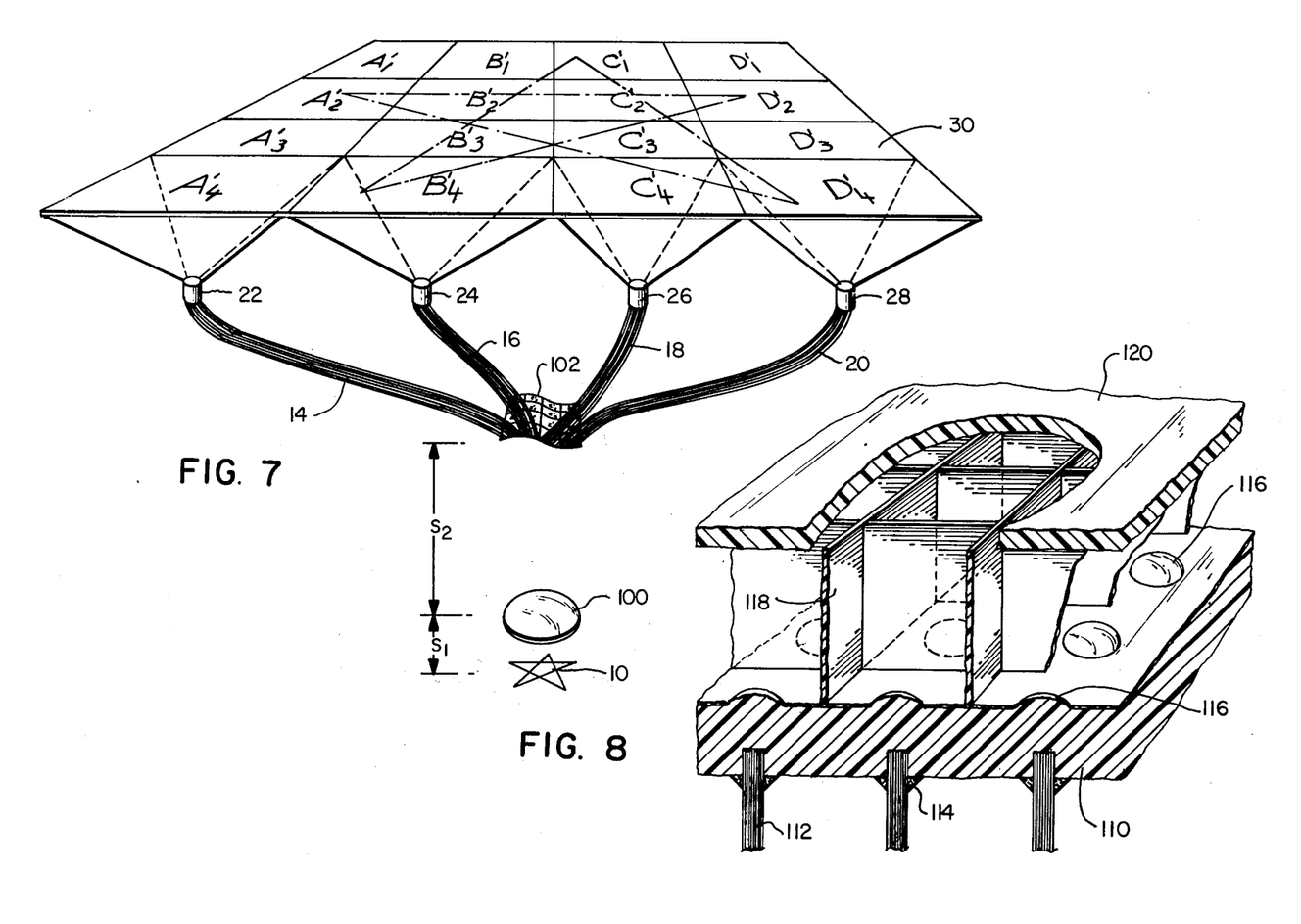
FIG. 7 is a view similar to FIG. 1 and illustrates a first stage for defining a first image on a Petzval surface, the latter defining an object for a COMO system.
FIGS. 8, 9 and 10 are partial sections of the termini and viewing screen of a COMO system.

In FIG. 7 of the drawings an arrangement is illustrated wherein a first stage magnification precedes the COMO stage, and is in the form of a magnifying lens 100. The lens is located a distance $S_1$ from a real object 10 and forms an image at Petzval surface 102 at a distance $S_2$ therefrom. This image is then further operated upon by the COMO stage to form the final image, all as explained above. The Petzval surface is usually one of rotation, as in a rather flat and slightly irregular skull cap. It is shown at FIG. 7 as a wavy surface to readily demonstrate that no matter what the precise form of the Petzval surface for lens 100, the lower termini of CLG members 14, 16, etc. may be exactly placed on the Petzval surface. From the image or surface 102, the screen 30 is illuminated in the same manner as explained with reference to FIG. 1.

At FIG. 8 of the drawings an arrangment is shown wherein the upper portion of a COMO stage may be inexpensively fabricated. The numeral 110 denotes a molded plastic face plate of index of refraction n into which are inserted the upper termini of coherent light guides 112 in recesses provided in the bottom of the face plate. A cement 114 holds the ends in place. Molded and integral bosses on the top of the face plate define magnifying lenses of radius R. Septa 118 inhibit diffusion of light on final viewing screen 120 from adjacent lenses 116. In a typical face plate construction such as that of FIG. 8, R = 9.8 mils, the distance from the ends of the CLG elements to the lenses 116 is 30 mils, the distance from the screen 120 to face plate 110 is one-half inch, the magnification of the stage is 25, and the index n of the plastic is 1.5. An opaque coating on the top surface of plate 110, except for the bosses 116, may be used to diminish any diffusion effects.

Figure 9:
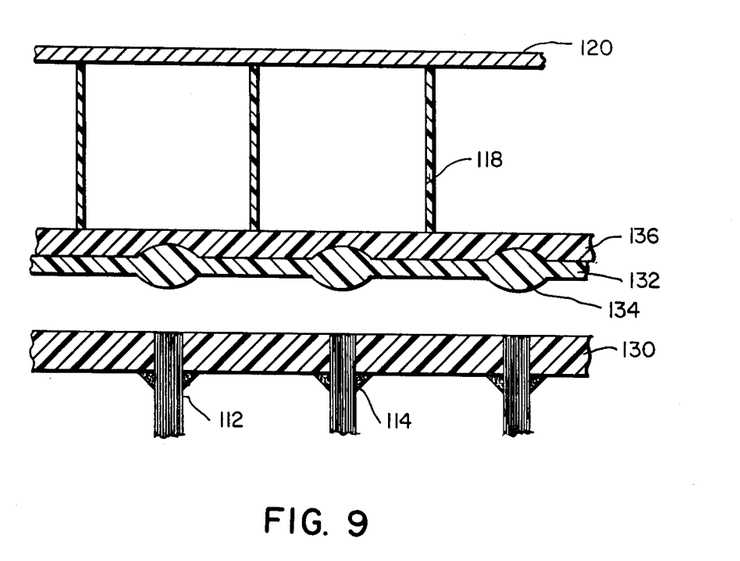

At FIG. 9, a similar arrangement is shown. Here the termini of CLG members 112 extend to and are flush with supporting plate 130. After the indicated air gap, molded plastic plate 132 having upper and lower bosses 134, and of one index of refraction, fits with touching molded plastic plate 136 of a different index of refraction. This defines a series of Fraunhofer achromat doublets.

Figure 10:
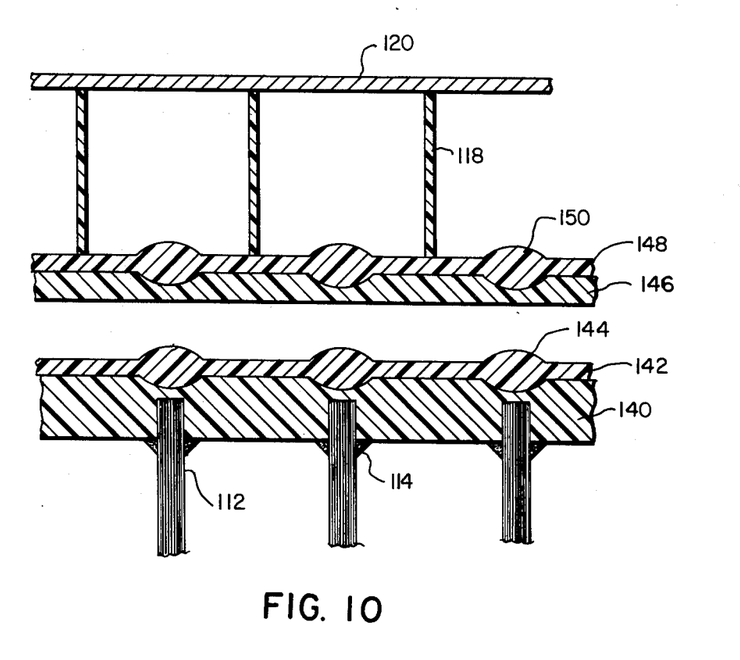

The similar arrangement of FIG. 10 illustrates a Lister-type projection lens system at the end of each coherent Light guide. Molded plastic plates 140 and 142, of different indices of refraction, define one set of doublets 144, while a second set of doublets 150 is defined by molded plastic plates 146 and 148 of different refracting indices.

Reference now to FIGS. 2 and 3 of the drawings discloses a method of precluding image scrambling when a single projecting lens 40 is employed, for any of the several embodiments. A single projection lens 40 will effect an inversion of the projected image, as illustrated at FIG. 2, where the (arrow) object is separately projected by each of two adjacent coherent light guides. This projection is clearly unsuitable. If now each adjacent bundle or guide is twisted 180° from its position of FIG. 2 to that illustrated at FIG. 3, faithful reproduction is effected. For projection lens systems at the various output termini of the fiber bundles or guides which do not cause image inversion, such twisting is not required.

In each of the embodiments of COMO, there are a plurality of optic axes which are defined by the axes of the several conducting light guides. This arrangement is in distinction to prior art devices of this general nature which possess only a single optic axis. It will further be observed that the input termini of the CLG members may be spaced from the object, as in FIGS. 1 and 7, or very near the object. In either case, the object surface (plane or curved) is defined by the input termini.

A variety of methods are employed for making microfiches and the above described microfiche reader will be compatible with any fiche, no matter what its mode of manufacture. In view of its great simplicity and lost cost, it is apparent that a microfiche may also be made by the same apparatus described above, merely by reversing the process. That is to say, the original, full size object (page of a book, etc.) is placed in a plane corresponding to plane 30. The photographic film is placed at a location corresponding to object 10, of either FIG. 1 or FIG. 7, depending upon the degree of reduction desired, and the exposure is made. In this case, the input termini of the coherent light guides become the output termini. In general, however, the input termini are defined by those termini of the CLG members which are contiguous to the object being magnified.

Figure 11:
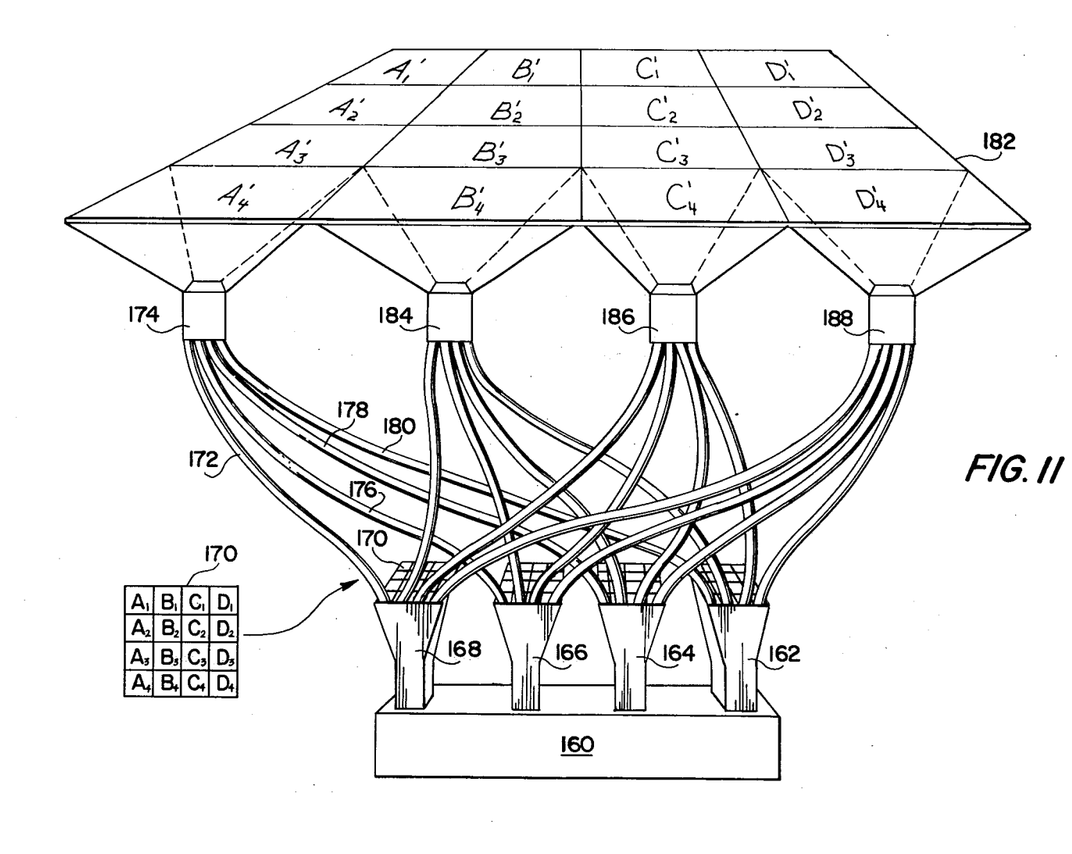

Referring now to FIG. 11, a color television system is described which utilizes several features of the invention. The numeral 160 generally denotes a color television receiving apparatus having four identical picture tubes 162, 164, 166, 168. Each tube may be considered as having a face 170 divided into zones as indicated to the left of tube 168. A coherent light guide denoted by the numeral 172 passes from zone $A_4$ of tube 168 to an upper terminal denoted generally by the numeral 174. Corresponding coherent light guides 176, 178, 180 pass from corresponding positions, i.e., $A_4$ portions, of the other picture tubes 166, 164, 162 up to terminal 174. The upper ends of coherent light guides 172, 176, 178, 180 are each associated with a projection lens in terminal bundle 174 for projection onto area $A'_4$ of final viewing screen 182. Corresponding coherent light guides from zones $B_4$ on tubes 162–168 are led to terminal bundle 184. Again, projection lenses are associated with each terminal of each coherent light guide for projection onto zone $B'_4$ of final viewing screen 182. Coherent light guides for zones $C_4$ lead from the tubes 152–168 into terminal bundle 186 and the same is true for zones $D_4$ and terminal bundle 188. Projection is, respectively, made on zones $C'_4$ and $D'_4$ of final viewing screen 182. The next row of zones $A_3$, $B_3$, $C_3$, $D_3$ on tubes 162–168 are optically coupled to final viewing screen 182 on the third row $A'_3$–$D'_3$ by means of other coherent light guides which are not illustrated. In a similar manner, the entire face of each of tubes 162–168 is optically covered with the lower ends of coherent light guides for projection on the final viewing screen. Each coherent light guide may consist of, for example, a bundle of internally reflecting glass fiber elements. Each fiber is typically 1 micron in diameter and a bundle may be 4 mils by 4 mils in cross-section. The mode of forming such coherent light guides is well known.

Television tube 162 may be a black and white tube, while tube 164 may, for example, project only yellow light, as by means of a color filter or phosphor, tube 166 may project only blue light, while tube 168 may project only red light. Thus, each television tube 162–168 will display the same image on its face, with the images differing only in color. These small images from tube faces 170 will be transferred and projected, in the manner above illustrated, to the main viewing screen 182. Alternatively, each tube 164, 166, 168 may project only black and white lights, and corresponding color filters may be provided at the upper termini of the fibers emanating from a corresponding tube face.

By the practice of the indicated arrangement, enormous savings of size may be realized in the construction of a television receiving apparatus.

Figure 12:
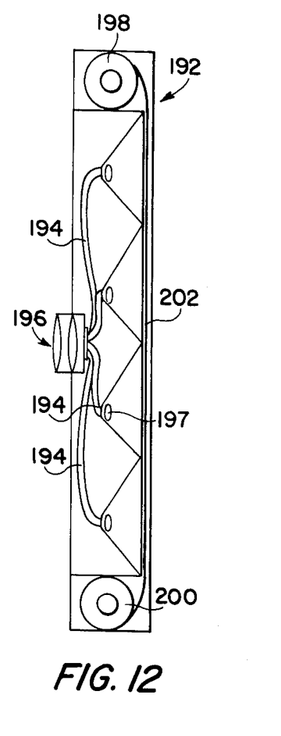
Figure 13:
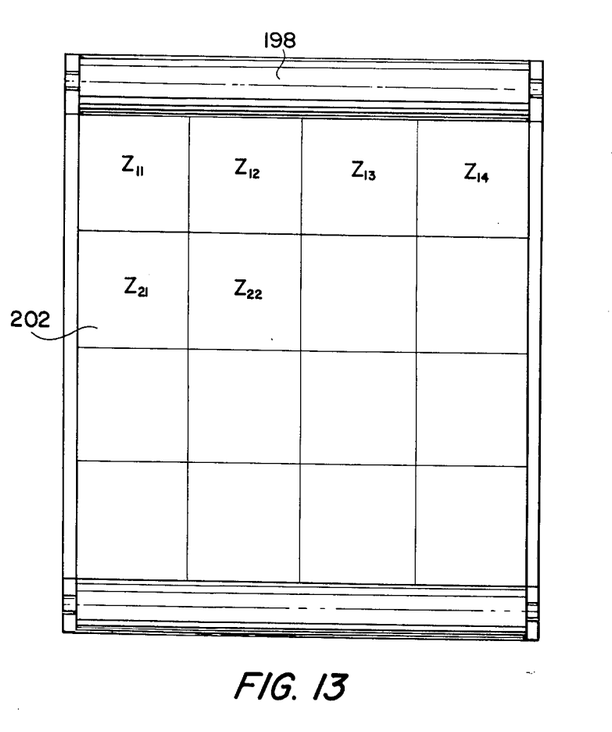

Referring now to FIGS. 12 and 13, a still further embodiment of the invention is illustrated as applied to a camera. The numeral 192 denotes generally the camera provided as indicated with a plurality of coherent light guides denoted by the numeral 194. These guides may be the same construction and arrangement as that illustrated in, for example, FIG. 11 of the drawings. Corresponding ends of the light guides are brought together to form a main trunk or main bundle. The main bundle is provided with an objective lens denoted generally by the numeral 196 which may be of any conventional construction. Although not illustrated, a camera shutter is provided in association with the objective 196. The ends of coherent light guides 194 are each provided with a projection lens denoted by 197. Each light guide 194 may be twisted as in the manner of FIG. 3 to preclude disection of projected images. The guides may be held in the indicated position by a plate or the like supporting the ends and the main bundle. As indicated at FIG. 13, there are 16 termini of coherent light guides 194 positioned so as to project images on various zones on photographic film 202. Zones on film 202 are denoted schematically by $Z_{11}$, $Z_{12}$, etc. In use, the camera is focused on an object, the shutter associated with lens 196 is operated and light from the object passes into the main trunk of the coherent light guides. The light is then projected on the various zones $Z_{11}$, etc. and the emulsion of film 202 activated.

A consideration of FIG. 12 will illustrate, proportionately, the advantages of such a camera. It is known that the "rule-of-thumb" for a photographic objective is that its focal length is approximately the length of the diagonal of the film. If one is to have large size films, then the focal length must be correspondingly large. This in turn requires a camera which is necessarily of considerble size. As a specific example, a camera having film which is $2\frac{1}{4} \times 2\frac{1}{4}$ inch requires roughly a 3 inch focal length lens. The reason for this rule or relationship is that it is extremely difficult to correct for aberrations which result from a wide angle field of view. In certain instances, it may be desirable to form the entrance face of the main bundle of coherent light guides in a concave or dished-out shape and position the photographic objective a short distance from this face. This yields a very sharp focus for all regions of the fiber bundle entrance face.

Figure 14:
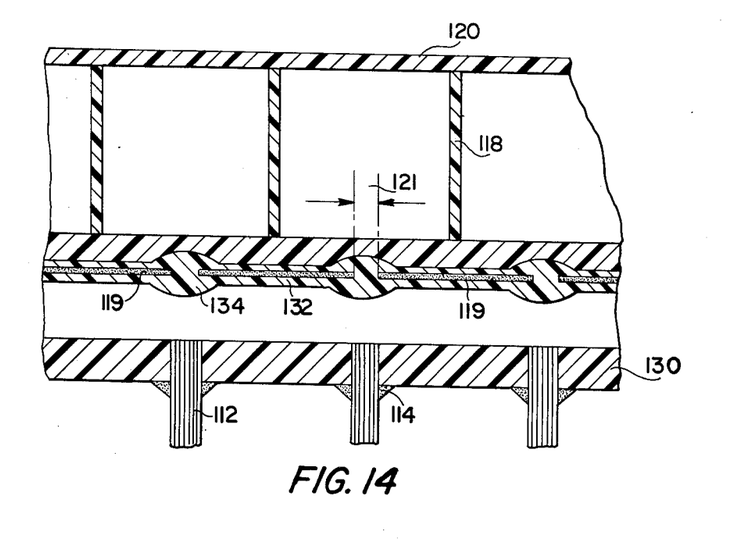

Referring now to FIG. 14 of the drawings, a still further embodiment is illustrated, here a modification of the embodiment previously described with respect to FIG. 9 of the drawings. The only difference between these two embodiments is the use of an aperture stop of opaque material denoted by the numeral 119. Any appropriate opaque material or substance may be placed in lens plate 132 having integral lenses 134. The opaque material covers the entire plate 132 except for circular regions 121 placed in the very center of each of the lenses 134. The diameter of the apertures 121 associated with each lensette 134 is preferably the focal length of each of the lenses 134. The opaque sheet 119 is preferably placed as indicated, although if desired may be placed below the lens plate 132 and above plate 130. The coherent light guides 112 are in optical alignment with the center of each aperture 121 of each lensette 134. The remaining elements illustrated at FIG. 14 find their counterparts in FIG. 9, already described.

Figure 15:
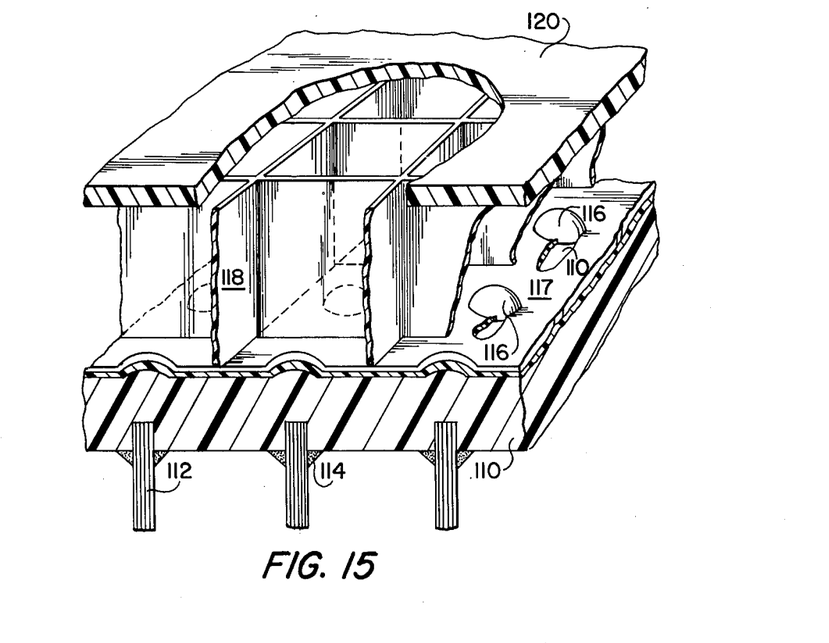

Referring now to FIG. 15 of the drawings, an embodiment is illustrated similar to that described and shown with respect to FIG. 8 of the drawings. In the embodiment shown at FIG. 15, an opaque coating 117 is placed on the top surface of transparent plate 110, such that the coating or layer 117 covers all regions of the top of plate 110 except the lensettes 116. This is illustrated by the cut-away portions shown at FIG. 15. The function of the opaque coating 117 is to serve as an aperture stop and thereby improve the resolution and quality of the final image on screen 120.

Figure 16:
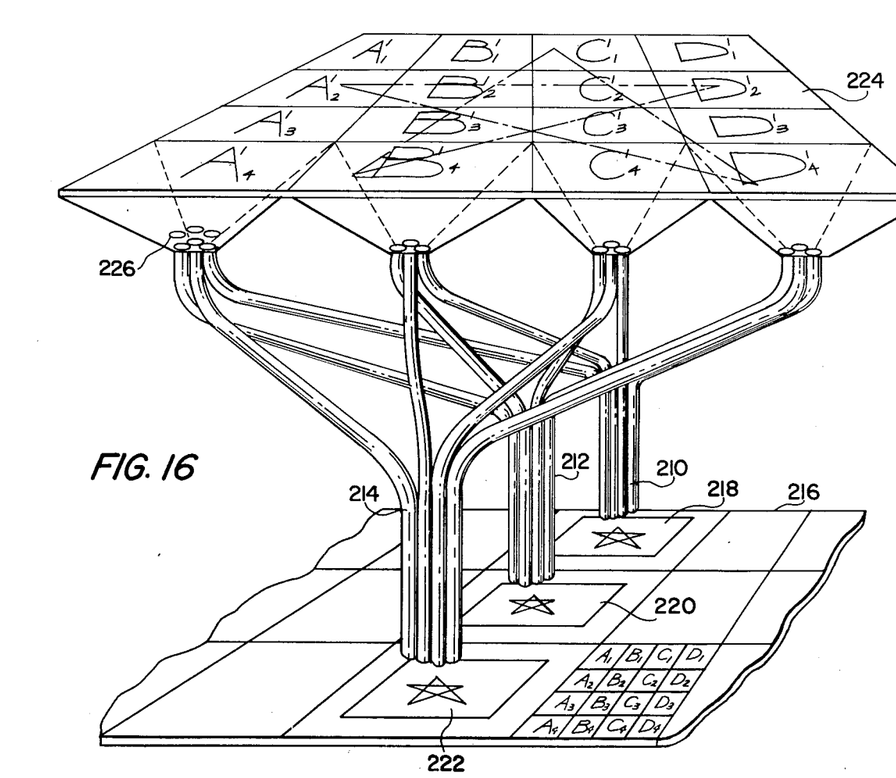

Referring now to FIG. 16 of the drawings, still another embodiment illustrating the principles of the invention is given. The numeral 210 represents a first main trunk of coherent light guides having its lower end positioned slightly above an object, here illustrated in the form of a star on a developed photographic film. Similar coherent light guide bundles 212 and 214 are positioned as indicated across the width of photographic film 216, the fil being adapted to contain black and white images and/or black and white prints or developed images. The numerals 218, 220, 222 represent, respectively, color filters such as green, red, and blue, positioned between the entrance (lower) ends of bundle 210, 212, 214 and the images on the film. Each main bundle, for example bundle 214, diverges into coherent light guides which terminate adjacent the lower portion of translucent viewing screen 224 near the indicated zones or areas. Each upper terminal is provided with an associated projection lens 226. As indicated schematically on film 216, portions of each image beneath each filter are homologously established on the viewing screen 224 by the coherent light guides.

The mode of operation of this embodiment is as follows. Assuming the device to be used as a camera for taking color pictures with black and white film, the object to be photographed is placed on or imaged on the screen 224 or on its plane. Light from the object then passes to the upper termini of the coherent light guides and is transmitted by the bundles down onto the film 216. Each main bundle 210, 212, 214 transmits the identical image through the filters and onto film 216. By virtue of filters 218, 220, and 222, if an object to be photographed, for example, contains no colors corresponding to the color filter 218, then only those portions of film 216 immediately beneath filters 220 and 222 will be activated. Each filter passes only one color and rejects (is opaque to) all other colors. Thus, if 222 is a red filter, the film beneath it will be activated only if the photographed scene contains red wavelengths.

To use the device as a projection apparatus, it is only necessary to reverse the process. That is to say, the black and white images on the film associated with each of the color filters are suitably illuminated, as either by reflected light or by light transmitted from the rear of the film onto the bottom faces of the main fiber bundles 210, 212, and 214. The images are then projected onto the viewing screen 224. The projected image on screen 224 will consist of the colors of the three filters, blended as they were in light from the original object. In order to take a next photograph, the film 216 is moved so that a fresh strip of photographic emulsion is exposed beneath the ends of the main bundles and the color filters. In the case where the device of FIG. 16 is used both as a camera and as a projector, it is not necessary to twist the coherent light guides to correct for image disection because if the objects on the photographic emulsion are disected, they will be reconstituted properly upon projection for read out.

Figure 17:
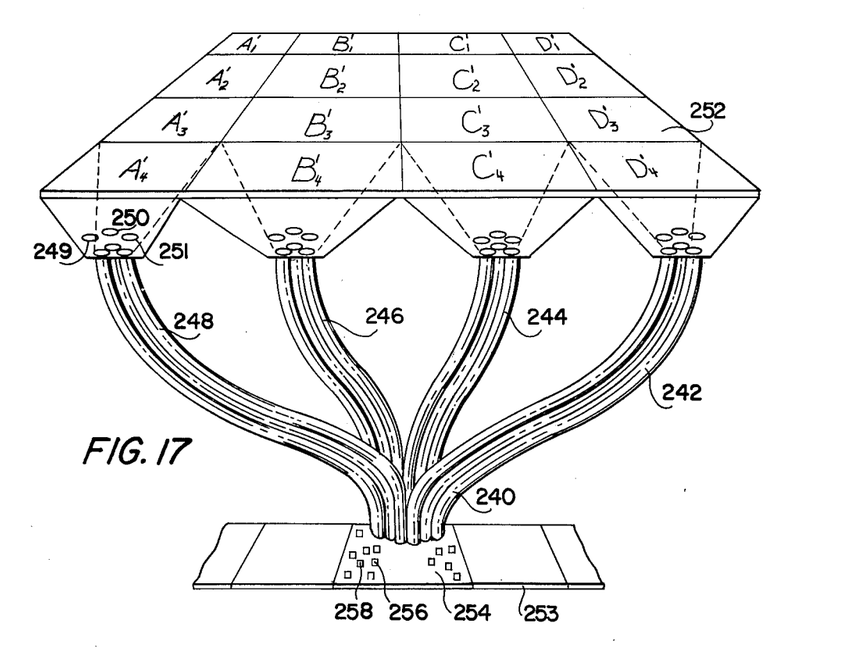

Referring now to FIG. 17 of the drawings, still another embodiment of the principles of the invention is illustrated. The numeral 240 notes a main bundle of coherent light guides of the type previously described. The main bundle diverges into triplet sets 242, 244, 246, 248 of coherent light guides. While only four are shown, it will be apparent that there are sixteen in all. Thus, eac zone A′$_1$, A′$_2$, etc. is associated with the upper termini of three coherent light guides. Each coherent light guide is provided at its upper terminal with an associated projection lens, illustrated only for the set 248. Lens 249 passes red light only, lens 250 passes green light only, lens 251 passes blue light only. The numeral 252 denotes a viewing screen, as for example, a translucent plastic sheet. Again, the screen 252 may be considered as being divided into projection zones A′$_1$, B′$_1$, etc. The numeral 253 denotes a (black and white) photographic film having portions 254 each adapted to define a single picture. The numerals 256 and 258 schematically indicate adjacent zones of the film which lie underneath the main bundle 240.

The mode of operation of the arrangement shown at FIG. 17 is as follows. Assuming the device is to be used as a camera and as a projector, an object or the image of an object is placed on or in the plane of viewing screen 252. Colored light from the object is transmitted through lenses 249, 250, 251 onto the upper termini of the coherent light guides. Each lens transmits only one color to its associated coherent light guide. The light then passes out from the lower face of main bundle 240 and onto film portion 254. The image portions represented by areas 256 and 258 are scrambled in the sense that, after development and inspection with the naked eye, there would be no image seen in the photographic emulsion other than a scrambled inage. Upon the reverse of the process, i.e.,, as by suitably illuminating the developed film portions, the picture is unscrambled and appears on the screen 252 in color. The coherent light guide sets 242, 244, etc. may come together in any manner to form main trunk 240, no homologous correspondence between the screen zones and the film zones being required.

As in the previous embodiments, black and white film is employed.

I claim:
1. A color optical system including,
   a. a plurality of coherent light guides having input termini, said input termini each defining a bundle,
   b. said coherent light guides diverging from each other over at least a portion of their length,
   c. the distance between the output termini of said guides being greater than the distance between the input termini,
   d. the output termini of said coherent light guides being rigidly positioned relative to each other,
   e. a screen adjacent said output termini and adapted to either receive colored light output projected therefrom or to pass colored light to the output termini,
   f. the said output termini each provided with a projecting lens interposed between it and said screen,
   g. a plurality of said bundles,
   h. a photographic film positioned beneath the input termini of said bundles for recording information on the screen,
   i. a different wavelength filter positioned between the input termini of each bundle end and said film,
   j. whereby unexposed film will record a number of identical black and white images equal to the number of bundles, each image corresponding to a color of an associated color filter, and whereby the film upon development will project a color image on the viewing screen from the black and white images.

2. A color optical system including,
   a. a plurality of coherent light guides having input termini, said input termini being contiguous to each other and defining a main bundle,
   b. a screen, the output termini of said coherent light guides positioned adjacent to but spaced from said screen and adapted to either receive colored light from the screen or to pass colored light to the screen, said main bundle being divided into sub-bundles, the sub-bundle output terminal being divergent from each other and being distributed over the area of said screen,
   c. a photographic film positioned adjacent said main bundle input termini, said coherent light guides being located between said screen and said film,
   d. the number of coherent light guides in each sub-bundle being equal, e. a color filter projection lens adjacent each output terminal of each coherent light guide in each sub-bundle, each projection lens passing light of substantially a single wavelength, the wavelengths passed being different for each output terminal in each sub-bundle.

f. whereby the photographic film upon exposure will selectively record at areas thereof corresponding to the location of the light guide input ends, a film area corresponding to a film bundle input and being recorded only if light from the object contains the color of the color filter associated with that fiber bundle, and whereby upon projection, after the film is developed, projection of light in the opposite direction will result in a color image of the original of the screen.

* * * * *